(12) United States Patent
Revink

(10) Patent No.: US 8,360,091 B2
(45) Date of Patent: Jan. 29, 2013

(54) VENTILATION FOR A REDUCING AGENT TANK

(75) Inventor: Ingo Revink, Ingolstadt (DE)

(73) Assignee: Audi AG, Ingolstadt (DE)

( * ) Notice: Subject to any disclaimer, the term of this patent is extended or adjusted under 35 U.S.C. 154(b) by 531 days.

(21) Appl. No.: 12/402,051

(22) Filed: Mar. 11, 2009

(65) Prior Publication Data
US 2009/0229674 A1 Sep. 17, 2009

(30) Foreign Application Priority Data
Mar. 14, 2008 (DE) .......................... 10 2008 014 363

(51) Int. Cl.
*F16K 24/04* (2006.01)
(52) U.S. Cl. .......................... 137/265; 137/197; 137/587
(58) Field of Classification Search .................. 137/265, 137/255, 197, 587
See application file for complete search history.

(56) References Cited

U.S. PATENT DOCUMENTS

| | | | | |
|---|---|---|---|---|
| 4,531,653 A * | 7/1985 | Sakata | ........................... | 137/587 |
| 5,464,466 A * | 11/1995 | Nanaji et al. | ........................ | 95/45 |
| 6,223,526 B1 * | 5/2001 | Wissler et al. | ................... | 60/286 |
| 6,321,692 B1 * | 11/2001 | Rayner | ......................... | 123/1 A |
| 6,374,868 B1 * | 4/2002 | Channing | ......................... | 141/9 |
| 6,634,341 B2 | 10/2003 | Crary et al. | | |
| 6,681,811 B2 * | 1/2004 | Channing | ......................... | 141/9 |
| 7,114,492 B2 * | 10/2006 | Reddy | ............................ | 123/518 |
| 7,257,945 B2 * | 8/2007 | Kass et al. | ....................... | 60/286 |
| 7,469,661 B2 * | 12/2008 | Kunstmann et al. | ........... | 123/1 A |
| 7,763,214 B2 * | 7/2010 | Iwase et al. | ................... | 422/177 |
| 7,845,164 B2 * | 12/2010 | Leonard | ......................... | 137/339 |
| 8,226,123 B2 * | 7/2012 | Chino et al. | .................. | 137/587 |
| 2007/0157602 A1 * | 7/2007 | Gschwind | ....................... | 60/274 |
| 2010/0031932 A1 * | 2/2010 | Mai et al. | ....................... | 123/520 |

FOREIGN PATENT DOCUMENTS

| | | |
|---|---|---|
| DE | 102 14 556 A1 | 12/2002 |
| DE | 103 37 572 A1 | 3/2005 |
| DE | 10 2006 027 487 A1 | 3/2007 |
| JP | 2005291086 A | 10/2005 |
| JP | 2006009606 A | 1/2006 |

* cited by examiner

*Primary Examiner* — Kevin Lee
(74) *Attorney, Agent, or Firm* — Novak Druce + Quigg LLP

(57) ABSTRACT

Ventilation for a reducing agent tank, having a first reducing agent tank which is provided with a first reducing agent fill opening, a fuel tank which is provided with a fuel fill opening and a ventilation device, as well as a first line through which the first reducing agent tank is connected to the fuel tank.

6 Claims, 5 Drawing Sheets

VENTILATION FOR A REDUCING AGENT TANK

The invention relates to ventilation for the reducing agent tank in a motor vehicle.

This ventilation is used in motor vehicles for equalizing the internal pressure of a reducing agent tank.

BACKGROUND OF THE INVENTION

DE 10 2006 027 487 A1 shows a vehicle tank for an aqueous urea solution in which there is an internal tank. A pump conveys the urea solution both out of the tank and also out of the internal tank of the tank to the exhaust gas line of an internal combustion engine. Ventilation takes place by way of a pressure control valve which is connected both to the internal tank and also to the outlet side of the pump. An activated charcoal filter can be assigned to the pressure control valve in order to reduce odor emission.

The disadvantage is that the vehicle tank filled with the urea solution is provided with its own ventilation device in the form of a pressure control valve with an optionally connected activated charcoal filter which entails additional weight in the motor vehicle and increased production costs.

DE 102 14 556 A1 shows a fuel and reducing agent filling system which has a tank for fuel and a tank for the reducing agent. Both tanks can be filled from the exterior with the pertinent liquids and have their own devices for ventilation, the ventilation of the reducing agent tank being made as a combination vent valve.

The disadvantage is that the vapors of the reducing agent can flow unobstructed out of the reducing agent tank through the combination vent valve to the exterior and thus lead to a not inconsiderable odor problem.

DE 103 37 572 A1 shows a storage tank for fuel and auxiliary substances of an internal combustion engine and/or devices assigned or connected downstream from it, which is made conical or pyramidal and has a removal opening on the bottom of the storage tank. In the storage tank there is furthermore a heating device for heating the medium. There is a ventilation opening on the tip of the storage tank.

The disadvantage is that the vapors of the medium located in the storage tank are released to the exterior through the ventilation opening; this constitutes a strong odor problem and in the case of fuel vapors also entails an explosion hazard.

The object of the following invention is therefore to make available ventilation for a reducing agent tank which can be integrated into a motor vehicle in a manner as economical as possible and with little added weight, and which does not result in any odor problem in the vicinity.

SUMMARY OF THE INVENTION

Ventilation for a reducing agent tank, having a first reducing agent tank which is provided with a first reducing agent fill opening, a fuel tank which is provided with a fuel fill opening and a ventilation device, as well as a first line through which the first reducing agent tank is connected to the fuel tank.

By the first line connecting the first reducing agent tank to the fuel tank, it is possible for the two tanks to be able to effect pressure equalization and gas exchange among one another. In this way it is possible for the first reducing agent tank to be vented into the fuel tank and thus for it to make do without its own ventilation device. This saves weight and also costs to a not inconsiderable degree. Only a first line is needed which can be made, for example, as a plastic hose and thus entails hardly any additional weight and takes up only little installation space. The reducing agent tank is vented via the ventilation device of the fuel tank which is already present. This ventilation device need not be structurally matched to new requirements since the first reducing agent tank vents into the volume of the fuel tank and is not directly connected to the ventilation device; this makes integration of the ventilation according to the invention for a reducing agent tank into existing systems very simple and economical. Furthermore, the ventilation device reliably avoids odor problems for the vicinity due to emerging gases since the ventilation device undertakes only pressure equalization without allowing foul-smelling gases to continuously escape.

In one preferred version the first reducing agent tank has a reducing agent delivery device.

In one preferred version the fuel tank has a fuel delivery device.

In one preferred version there is a second line through which the first reducing agent tank is connected to the fuel tank, and a fluid flow from the respective tank can pass through only one of the two lines.

In one preferred version there is a second reducing agent tank which has a second reducing agent fill opening and a second reducing agent delivery device and is connected to the fuel tank by a third line. Thus it is possible to build a system of active and passive reducing agent tanks, the active reducing agent tank being the heatable first reducing agent tank and the passive reducing agent tank being the unheated, second reducing agent tank.

In one preferred version the first and/or the second and/or the third line has a first valve.

In one preferred version the first valve is made as a nonreturn valve.

In one preferred version the first valve is impassable to liquids, and is made preferably as a rollover valve and especially preferably as a float rollover valve. When one of the two tanks is overfilled, this prevents liquid from being able to overflow through the lines into the respectively other tank; this could result in unwanted mixing of the two liquids.

In one preferred version the first and the second reducing agent fill openings can be filled at the same time. This greatly facilitates filling of the reducing agent tank since the two reducing agent tanks can be filled at the same time through a single opening.

In one preferred version the ventilation device is formed by a second valve which is located close to the fuel tank, preferably a valve impassable to liquids and especially preferably a float rollover valve.

In one preferred version the ventilation device is formed by a third valve, preferably a nonreturn valve and especially preferably a rollover valve which is located on a ventilation line.

In one preferred version the ventilation device is formed by a second valve located close the fuel tank, preferably a valve which is impassable to liquids and especially preferably a float rollover valve which is connected by way of a ventilation line to a third valve, preferably a nonreturn valve and especially preferably a rollover valve. Thus, the emergence of fuel from the fuel tank through the ventilation device is effectively prevented. Furthermore, it is not possible either for foreign bodies or gases to be able to penetrate through the ventilation device into the fuel tank.

In one preferred version in place of one of the first valves there is an immersion tube. This makes it possible to dispense with costly valves and at the same time constitutes relatively high protection against unwanted passage of liquid.

In one preferred version the first reducing agent tank, the second reducing agent tank and the fuel tank have a gas volume and a liquid volume.

In one preferred version the first valve is located in the gas volume.

In one preferred version the immersion tube is located in the liquid volume.

In one preferred version the reducing agent tank has a heating device. Thus it is possible to keep the reducing agent flowable even at low temperatures.

In one preferred version the reducing agent tank is filled with a urea solution, preferably a 32.5% urea solution.

In one preferred version the fuel tank is filled with diesel.

DETAILED DESCRIPTION OF THE PREFERRED EMBODIMENTS OF THE INVENTION

Figure 1:
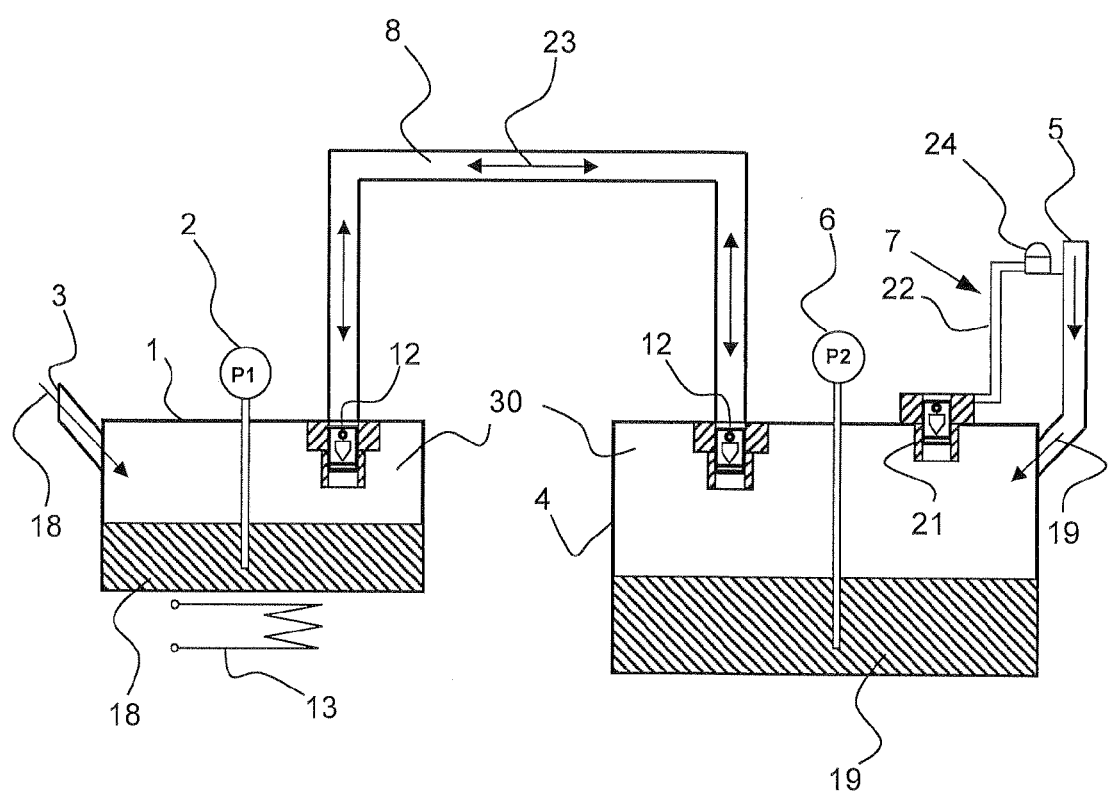
FIG. 1 shows the ventilation for a reducing agent tank with one connecting line.

As shown in FIG. 1, the ventilation for a reducing agent tank has a first reducing agent tank 1 which can be filled with reducing agent 18, preferably with urea, by way of a first reducing agent fill opening 3. The urea 18 can be taken from the first reducing agent tank 1 by a reducing agent delivery device 2 for further use. Furthermore, the first reducing agent tank 1 has a heating device 13 which prevents freezing of the urea 18 at low temperatures.

A fuel tank 1 which is filled with fuel 19, preferably diesel, has a fuel fill opening 5 for filling the fuel tank 1 with diesel 19. The fuel delivery device 6 is designed for removing diesel 19 from the fuel tank 4. On the fuel tank 4 there is furthermore a ventilation device 7 which among others is formed by a float rollover valve 21 which is located close to the fuel tank 4. The float rollover valve 21 is connected by a ventilation line 22 to a rollover valve 24 which is located in the region of the entry to the fuel fill opening 5 such that pressure equalization with the exterior can be done.

The first reducing agent tank 1 is connected to the fuel tank 4 by a first line 8 which on its respective connections to the tanks 1, 4 has one float rollover valve 12 each which is located in the gas volume 30 of the respective tank 1, 4. Alternatively, the use of an overpressure valve or an immersion tube with or without a liquid trap is also conceivable, the immersion tube discharging into the liquid volume 18, 19 of the respective tank 1, 4. Thus, pressure equalization 23 between the first reducing agent tank 1 and fuel tank 4 is possible by the first line 8. In this way the first reducing agent tank 1 first vents into the fuel tank 4 which in turn can vent to the exterior through the ventilation device 7.

Figure 2:
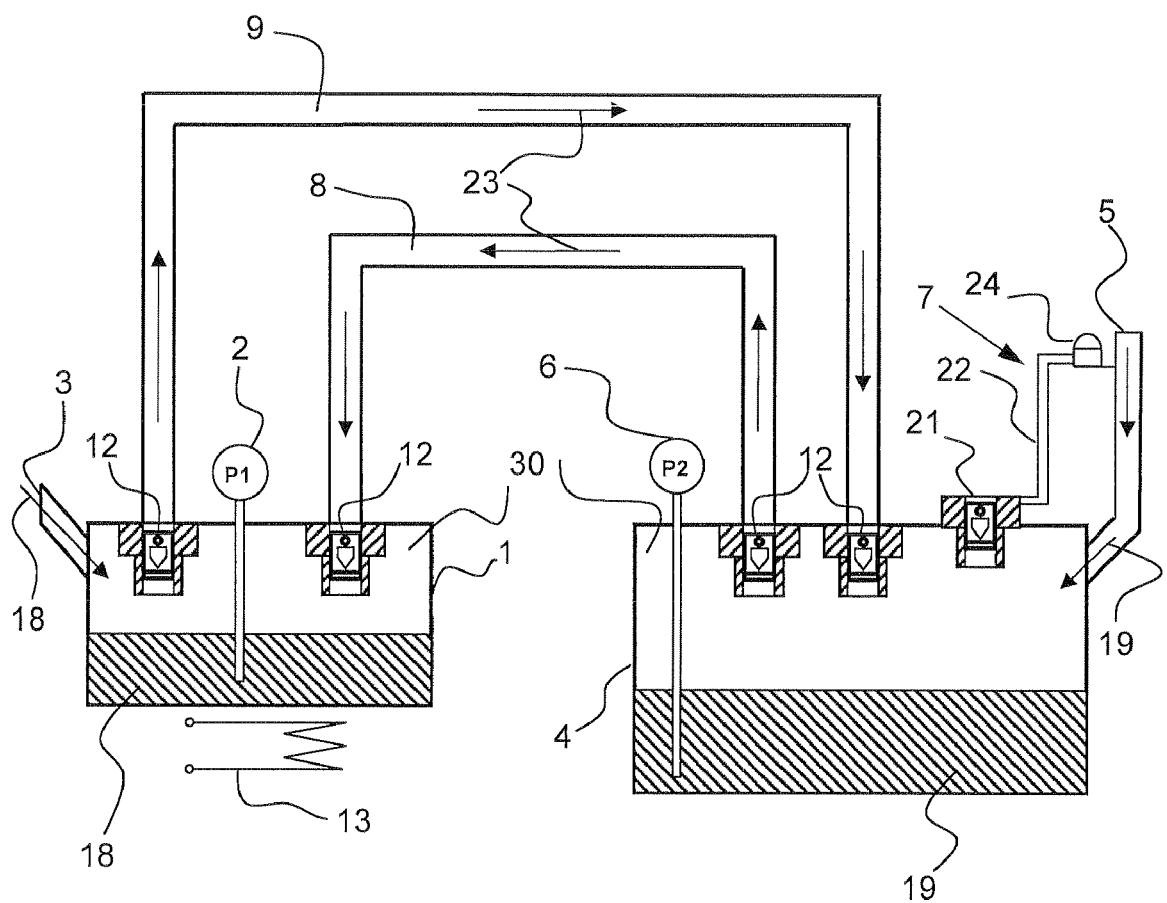
FIG. 2 shows the ventilation for a reducing agent tank with two connecting lines.

As shown in FIG. 2, the ventilation for a reducing agent tank has a first reducing agent tank 1 which can be filled with reducing agent 18, preferably with urea, by way of a first reducing agent fill opening 3. The urea 18 can be taken from the first reducing agent tank 1 by a reducing agent delivery device 2 for further use. Furthermore, the first reducing agent tank 1 has a heating device 13 which prevents freezing of the urea 18 at low temperatures.

A fuel tank 1 which is filled with fuel 19, preferably diesel, has a fuel fill opening 5 for filling the fuel tank 1 with diesel 19. The fuel delivery device 6 is designed for removing diesel 19 from the fuel tank 4. On the fuel tank 4 there is furthermore a ventilation device 7 which among others is formed by a float rollover valve 21 which is located close to the fuel tank 4. The float rollover valve 21 is connected by a ventilation line 22 to a rollover valve 24 which is located in the region of the entry to the fuel fill opening 5 such that pressure equalization with the exterior can be done.

The first reducing agent tank 1 is connected to the fuel tank 4 by a first line 8 which on its respective connections to the tanks 1, 4 has one float rollover valve 12 each which is located in the gas volume 30 of the respective tank 1, 4. Alternatively, the use of an overpressure valve or an immersion tube with or without a liquid trap is also conceivable, the immersion tube discharging into the liquid volumes 18, 19 of the respective tank 1, 4. Furthermore, the first reducing agent tank 1 is connected to the fuel tank 4 by a second line 9 which has one float rollover valve 12 each on its respective connections to the tanks 1, 4. The float rollover valves 12 are each designed such that pressure equalization 23 for one of the tanks 1, 4 can take place only in one of the two lines 8, 9 in one direction. Thus, pressure equalization between the two tanks 1, 4 and through the ventilation device 7 with the exterior is also ensured.

Figure 3:
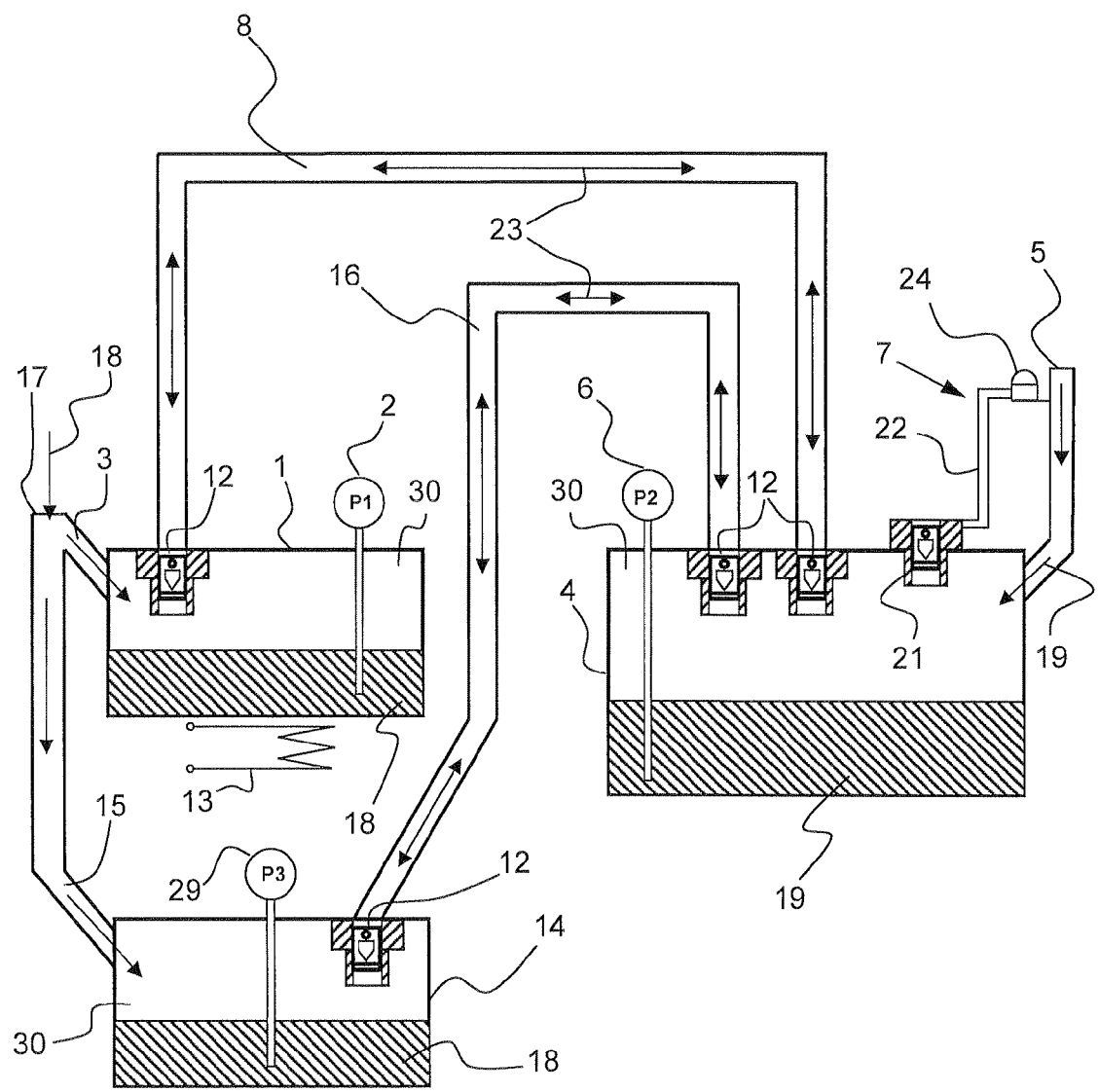
FIG. 3 shows the ventilation for two reducing agent tanks.

As shown in FIG. 3, the ventilation for a reducing agent tank has a first reducing agent tank 1 which can be filled with reducing agent 18, preferably with urea, by way of a first reducing agent fill opening 3. The urea 18 can be taken from the first reducing agent tank 1 by a reducing agent delivery device 2 for further use. Furthermore, the first reducing agent tank 1 has a heating device 13 which prevents freezing of the urea 18 at low temperatures.

Furthermore, there is a second reducing agent tank 14 which can be filled with reducing agent 18 by way of a second reducing agent fill opening 15 and from which the reducing agent 18 can be taken by a second reducing agent delivery device 29. The two reducing agent fill openings 3 and 15 are connected to one another such that they can be filled at the same time through a common opening 17.

Moreover, there is a fuel tank 1 which is filled with fuel 19, preferably diesel, and has a fuel fill opening 5 for filling the fuel tank 1 with diesel 19. The fuel delivery device 6 is designed for removing diesel 19 from the fuel tank 4. On the fuel tank 4 there is furthermore a ventilation device 7 which among others is formed by a float rollover valve 21 which is located close to the fuel tank 4. The float rollover valve 21 is connected by a ventilation line 22 to a rollover valve 24 which is located in the region of the entry to the fuel fill opening 5 such that pressure equalization and gas exchange with the exterior can take place.

The first reducing agent tank 1 is connected to the fuel tank 4 by a first line 8 which on its respective connections to the tanks 1, 4 has one float rollover valve 12 each which is located in the gas volume 30 of the respective tank 1, 4. Alternatively, the use of an overpressure valve or an immersion tube with or without a liquid trap is also conceivable, the immersion tube discharging into the liquid volumes 18, 19 of the respective tank 1, 4. The first line 8 thus enables pressure equalization 23 between the first reducing agent tank 1 and the fuel tank 4. In this way, the first reducing agent tank 1 can first vent into the fuel tank 4 which in turn can vent to the exterior through the ventilation device 7.

The second reducing agent tank 14 is connected to the fuel tank 4 by a third line 16 which on its respective connections to the tanks 14, 4 has one float rollover valve 12 each which is located in the gas volume 30 of the respective tank 14, 4. Alternatively the use of an overpressure valve or an immersion tube with or without a liquid trap is also conceivable, the immersion tube discharging into the liquid volume 18, 19 of the respective tank 14, 4. The third line 16 thus enables pressure equalization 23 between the second reducing agent tank 14 and the fuel tank 4. In this way the second reducing agent tank 14 can first vent into the fuel tank 4 which in turn can vent to the exterior through the ventilation device 7. Using a first 1 and a second reducing agent tank 14 makes it possible to build a system of active and passive reducing agent tanks, the active reducing agent tank being the heatable first reducing agent tank 1 and the passive reducing agent tank being the unheated, second reducing agent tank 14.

Figure 4:
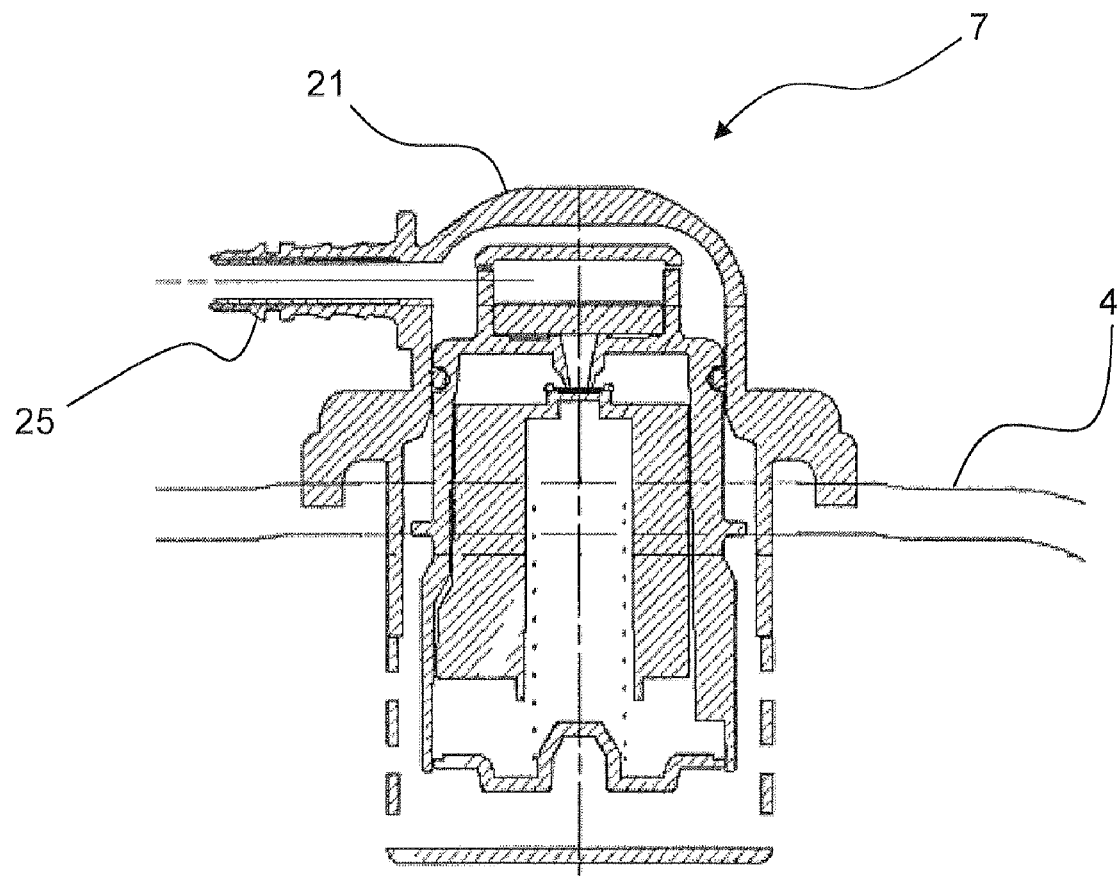
FIG. 4 shows a sectional view of the second valve.

FIG. 4 shows a second valve 21 which is made as a float rollover valve, which is part of the ventilation device 7, and which is located on the fuel tank 4. At the exit of the second valve 21 there is a connecting piece 25 for connection of the ventilation line 22. The second valve 21 which is made as a float rollover valve has the property that gases rising from the fuel 19 from the fuel tank 4 can pass through it in the direction of the ventilation line 22, but liquid fuel 19 cannot travel into the connecting line 22 due to the closing of the second valve 21.

Figure 5:
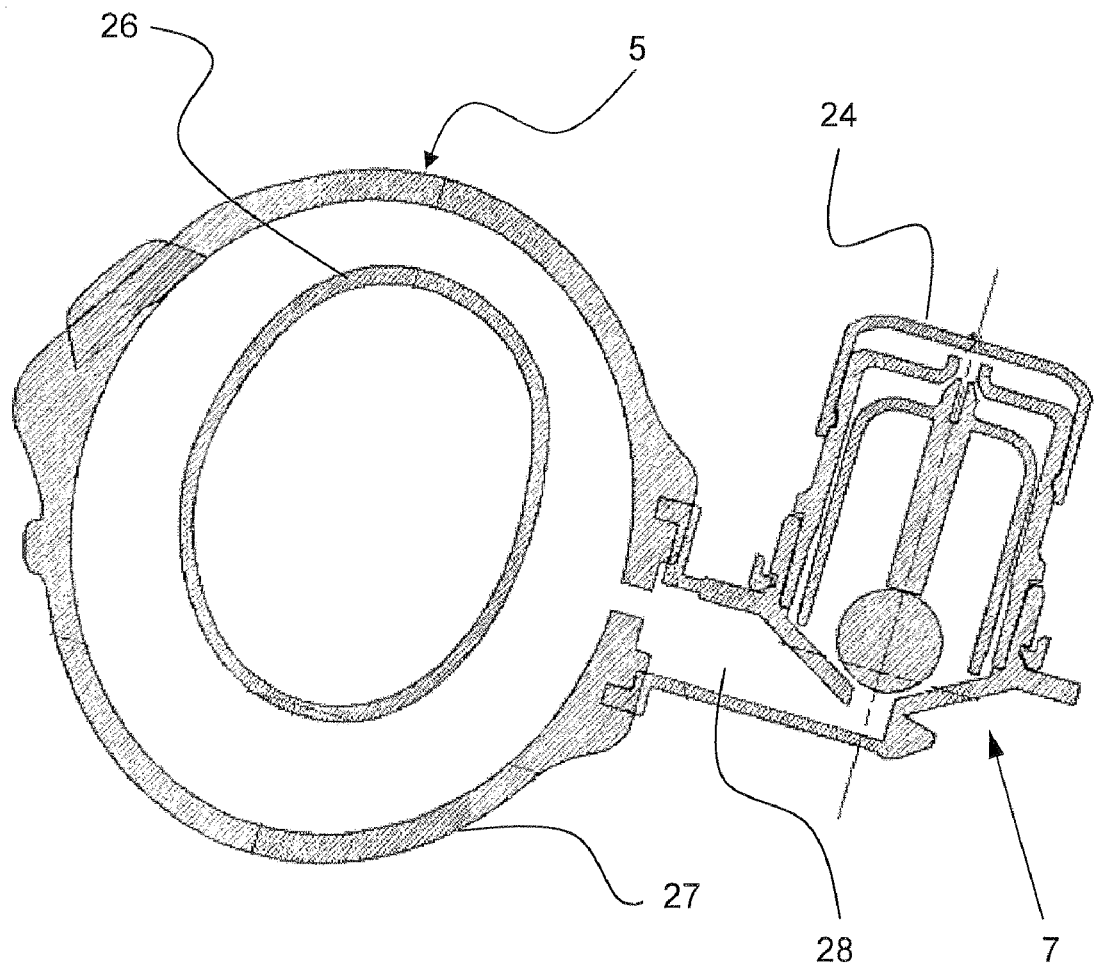
FIG. 5 shows a sectional view of the third valve.

FIG. 5 shows a third valve 24 which is made as a rollover valve, which is part of the ventilation device 7 and which is located on the fuel fill opening 5. The fuel fill opening 5 accordingly consists of an outer tube 27 which leads to the fuel tank 4, and a much shorter inner tube 26 which is used to prevent fuel from reaching the rollover valve during the process of filling the fuel tank 4. The ventilation line 22 is connected to the outer tube 27 of the fuel fill opening 5. Gases rising from the fuel 19 are routed through the connecting piece 28 to the rollover valve 24 and are released to the exterior through this valve. The rollover valve 24 has the property that it opens only when there is an overpressure in the fuel fill opening 5 and releases it.

The invention claimed is:

1. A ventilation system for a motor vehicle provided with a fuel tank and a reducing agent tank, comprising:
    a first ventilation line interconnecting said tanks;
    a vent valve disposed at each end of said first ventilation line;
    means for injecting fuel into said fuel tank;
    a second ventilation line interconnecting said fuel tank and said fuel injecting means;
    a third vent valve disposed at an end of said second ventilation line; and
    means for injecting reducing agent into said reducing agent tank.

2. A system according to claim 1 including a vent valve disposed in said second ventilation line between said third vent valve thereof and said fuel injecting means.

3. A system according to claim 1 including a third ventilation line interconnecting said fuel and reducing agent tanks, provided with vent valves disposed at the ends thereof.

4. A system according to claim 1 including means for heating said reducing agent tank.

5. A system according to claim 1 including:
    a second reducing agent tank;
    a ventilation line interconnecting said fuel tank and said second reducing agent tank, provided with vent valves at the ends thereof.

6. A system according to claim 5 including means for injecting reducing agent into said second reducing agent tank.

* * * * *